United States Patent
Brücher

[15] 3,683,713
[45] Aug. 15, 1972

[54] SHAFT DRIVE FOR SCRAPERS
[72] Inventor: Peter Brücher, Berlin, Germany
[73] Assignee: Borsig Gesellschaft mit beschrankter Haftung, Berlin, Germany
[22] Filed: Nov. 27, 1970
[21] Appl. No.: 93,073

[30] Foreign Application Priority Data
Dec. 1, 1969 Germany..........P 19 61 697.8

[52] U.S. Cl. ..............................74/243 R, 64/28 R
[51] Int. Cl. .......................F16h 55/30, F16d 3/56
[58] Field of Search ......................74/243 R; 64/28 R

[56] References Cited
UNITED STATES PATENTS

| | | |
|---|---|---|
| 3,103,004 | 9/1963 | Murray......................64/28 R |
| 2,643,530 | 6/1953 | Lathrop..............74/243 R X |
| 2,841,454 | 7/1958 | Cheramie............74/243 R X |
| 3,049,898 | 8/1962 | Voth..........................64/28 R |
| 3,435,695 | 4/1969 | Ribers...................64/28 R X |

*Primary Examiner*—Leonard H. Gerin
*Attorney*—Walter Becker

[57] ABSTRACT

A shaft drive, especially for scraper coolers, in which the drive conveying sprocket wheel is rotatably journaled on a stationary trunnion while for the transmission of the torque from the sprocket wheel to the shaft to be driven there are provided entraining means keyed to said shaft, and overload breaking pin means coupling said sprocket wheel to said entraining means.

4 Claims, 4 Drawing Figures

Inventor
Peter Brücher

SHAFT DRIVE FOR SCRAPERS

The present invention relates to a shaft drive, especially for scraper coolers, in which the drive is effected by means of a roller chain.

With shaft drives of this type, it is necessary to journal the shaft or the sprocket wheel, which journaling on one hand absorbs the radial load which is caused by the pulling force of the chain and is considerable, and on the other hand brings about a fixed positioning of the sprocket wheel or shaft in axial direction.

To meet these requirements, it is known to arrange an anti-friction or sliding bearing, mostly on the back side of the driving housing and to mount the sprocket wheel on the shaft in an overhang position.

Furthermore, drives have become known, according to which, a second bearing area is provided. In this instance, the sprocket wheel is located between the bearings and is likewise connected to the shaft. Such an arrangement is disclosed, for instance, in the Borsig pamphlet 6.61 Ha 352, 12156 of June, 1961, page 2, type K. Due to the direct connection of the sprocket wheel to the shaft, it will be appreciated that with the heretofore known designs of the type involved, in view of the radial load, a bending of the shaft occurs, in other words, the shaft is subjected to considerable bending stresses. These bending stresses may, even when making the shaft rather strong, and when carefully finishing the shaft, bring about a fracture of the shaft, in view of rotary alternating bending stresses. Moreover, the bending of the shaft has a harmful effect upon the tightness of the stuffing box packing and upon the life of the bearing.

It is, therefore, an object of the present invention to provide a shaft drive of the above mentioned general type, in which the shaft will be substantially kept free from radial forces, i.e. from any bending stresses.

It is another object of this invention to provide a shaft drive as set forth in the preceding paragraph, in which the shaft will be subjected merely to the torsion stresses brought about by the frictional resistance encountered by the scraper blades and the bearing areas.

These and other objects and advantages of the invention will appear more clearly from the following specification, in connection with the accompanying drawing, in which.

Figure 2:
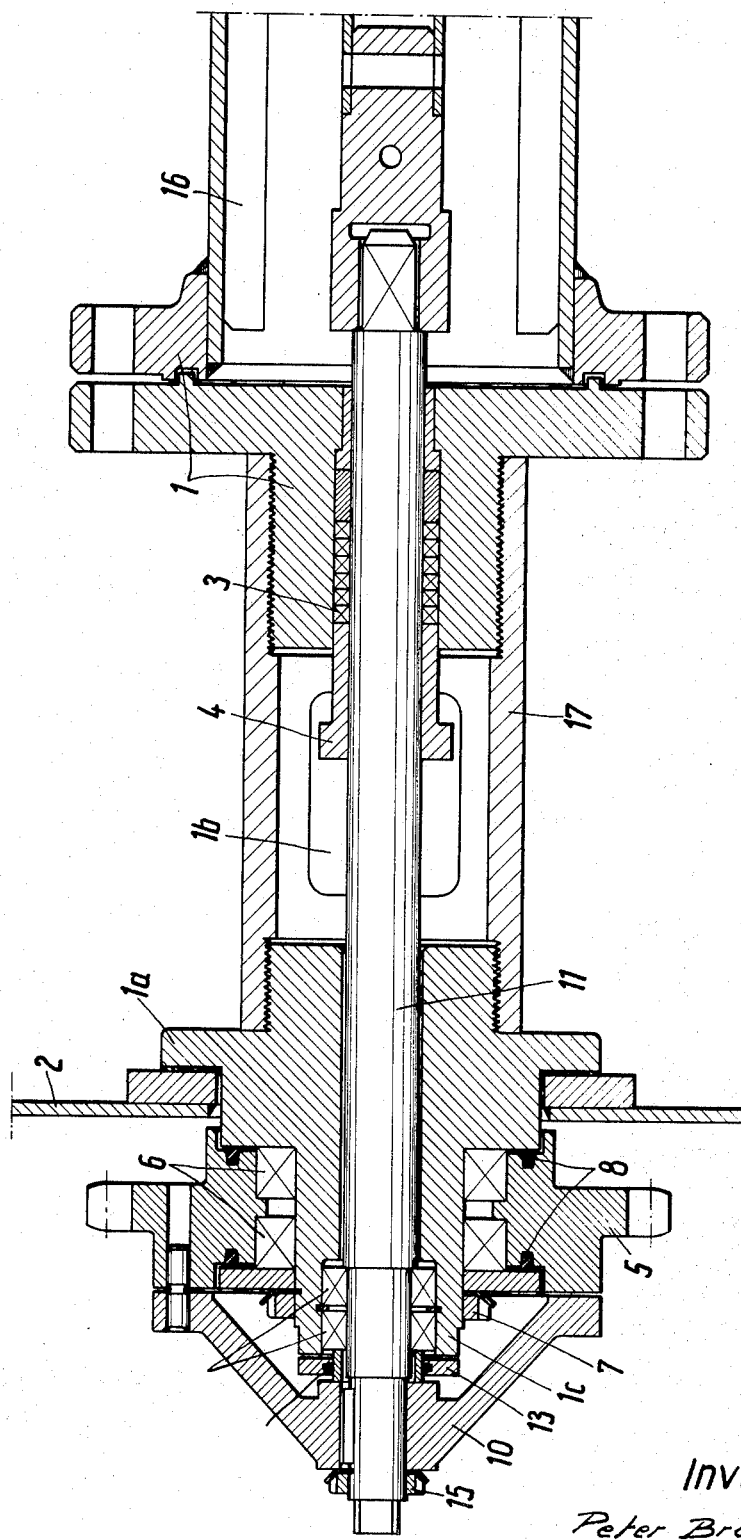
FIG. 2 shows a section similar to that of FIG. 1, but differs therefrom in that the bearing neck for the sprocket wheel is threadedly connected to the housing or cage surrounding the drive shaft.
Figure 3:
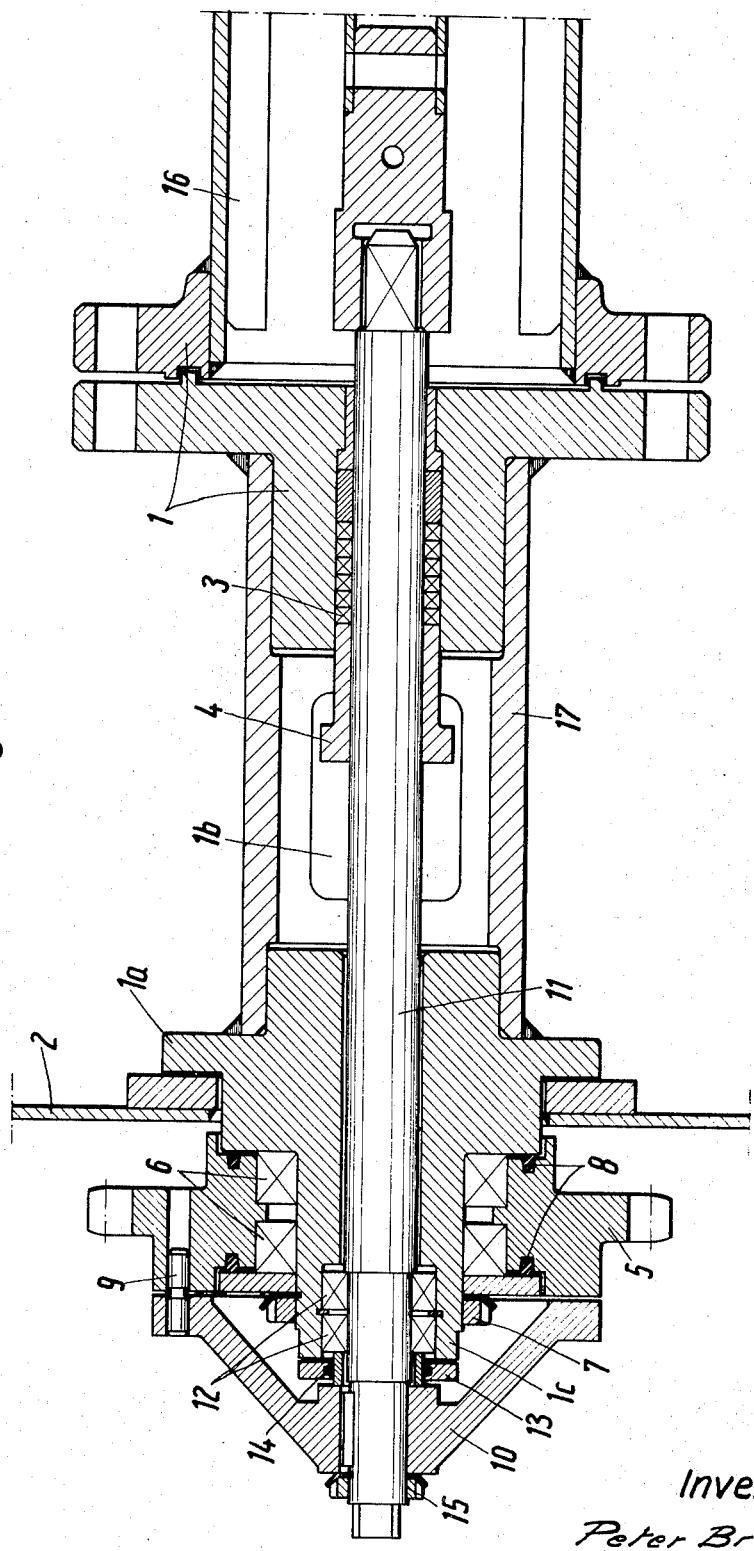

FIG. 3 differs from FIG. 2 in that the bearing neck is welded to the housing or cage surrounding the drive shaft.

Figure 4:
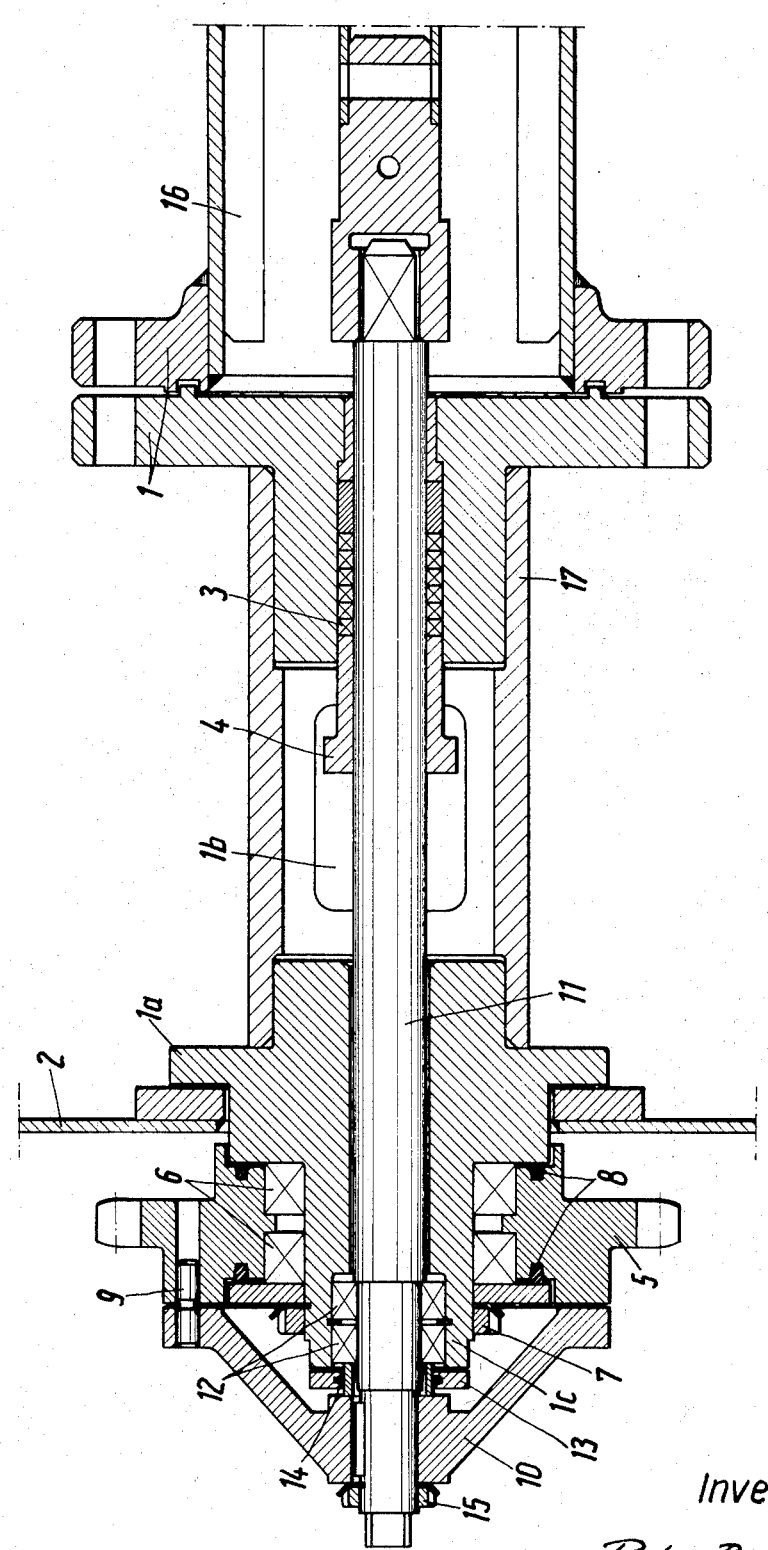

FIG. 4 is a section similar to that of FIG. 2 but differs therefrom in that the housing or cage surrounding the drive shaft has been shrunk on the bearing neck.

The shaft drive according to the present invention is characterized primarily in that the sprocket wheel is rotatably arranged on a stationary trunnion, and is furthermore characterized in that overload breaking pins and an entraining means are provided for transmitting the torque of the sprocket wheel to the shaft.

According to a further feature of the invention, the stationary trunnion is formed by the bearing neck of a shaft housing, while the bearing neck and the shaft housing form a single cast piece.

Due to aggressive media which may be in the scraper cooler and therefore frequently require special material for the shaft housing behind the stuffing box, it is suggested according to a further development of the invention to connect the trunnion to its one or more sectional shaft housing by screws, welding, or in any other convenient manner.

Referring now to the drawing in detail, the arrangement shown therein comprises a shaft housing 1 which has one side provided with a flange F adapted to have connected thereto the double pipe element characteristic for scraper coolers, and on the other side has a strong flange 1a to which the rear wall 2 of a driving case is connected. Between the two flanges F and 1a, there is provided a stuffing box packing 3 for sealing the passage through which the shaft extends. The gland 4 of said stuffing box packing 3 is accessible by lateral windows 1b in the cast body. The bearing neck 1c provided on the cast body extends into the driving case and supports the sprocket wheel 5 which is rotatably supported by two tapered roller bearings 6. The adjustment of the axial play of the sprocket wheel 5 is effected by a peg nut 7. The entry of foreign bodies or the discharge of lubricant from the two tapered roller bearings 6 is prevented by sealing rings 8 at the end faces of the sprocket wheel wheel hub. The torque of the sprocket wheel 5 is, by means of overload breaking pins 9, and an entraining member 10, conveyed to the shaft 11.

The central alignment of shaft 11 with regard to the sprocket wheel 15 is effected by two antifriction tapered roller bearings 12 which are arranged in a turned-out portion of the bearing neck 1c. The tapered roller bearings 12 bring about an axial positioning of shaft 11. The seal of these bearing chambers is effected by means of a bearing cover 13 and a sealing ring 14. The adjustment of the axial play of shaft 11 is effected by means of a shaft nut 15. The scraper blades are designated with the reference numeral 16.

Figure 1:
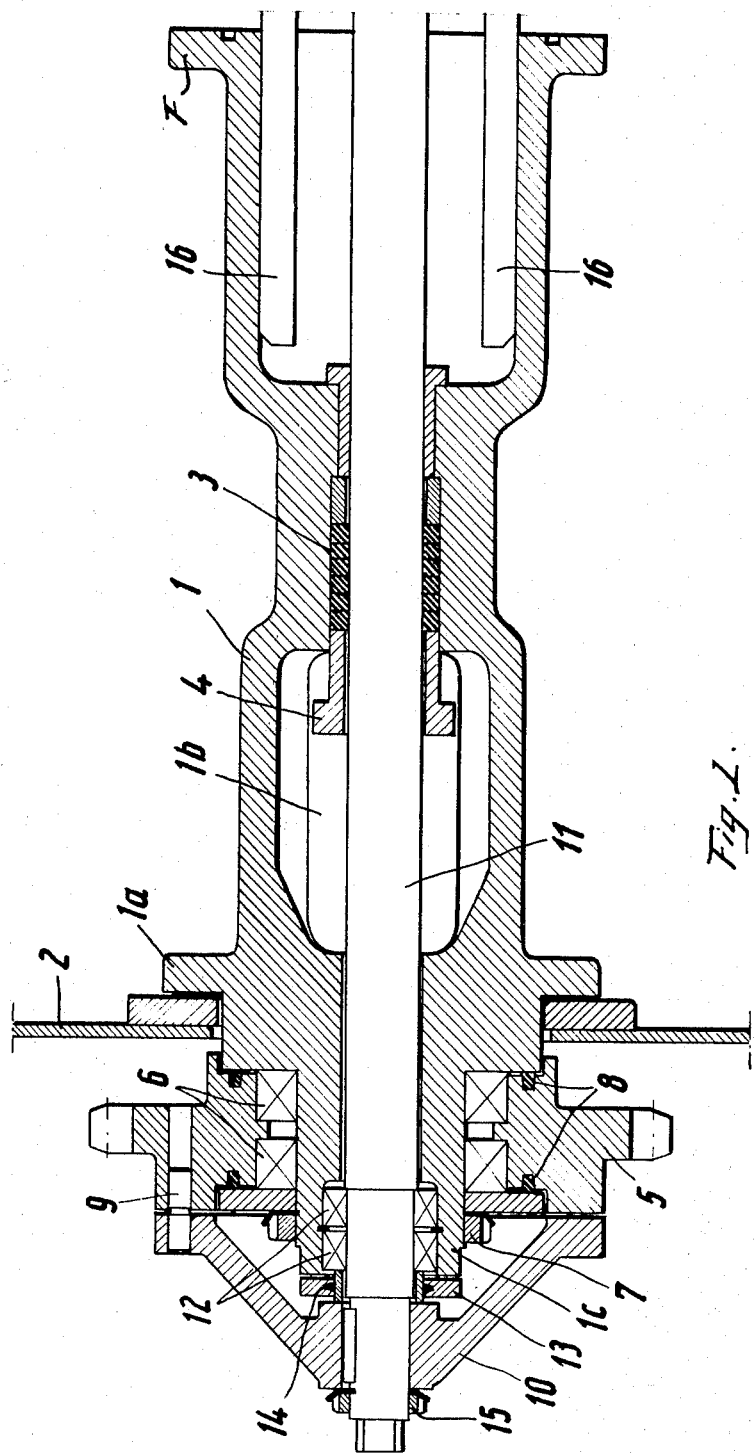
FIG. 1 is a section through a shaft drive according to the present invention, in which the bearing neck for the sprocket wheel forms one single integral piece with the housing for the drive shaft.

FIGS. 2, 3 and 4 illustrate slight modifications over the design of FIG. 1. More specifically, while according to FIG. 1 the bearing neck 1c forms a single cast piece with the housing 1 for shaft 11, the neck bearing 1c of FIG. 2 is threaded at T to the housing portion or cage 17. With the design of FIG. 3, the bearing neck 1c is welded at W to the housing portion 17a. Finally, with the design of FIG. 4, the housing section 17c is shrunk upon the bearing section 1b.

As will be evident from the above, the arrangement according to the present invention is characterized by the advantage that bending stresses are prevented in the shaft. Moreover, the seal of the stuffing box packing is improved and the life of the bearings is lengthened.

It is, of course, to be understood that the present invention is, by no means, limited to the particular construction shown in the drawing, but also comprises any modifications within the scope of the appended claims.

What I claim is:

1. A shaft drive, especially for scraper coolers, which includes: stationary housing means having one end portion provided with a trunnion formed as a bearing neck, a sprocket wheel rotatably journaled on said trunnion, a shaft rotatably journaled within said housing means, entraining means keyed to said shaft, and overload breaking pin means interconnecting said sprocket wheel and said entraining means.

2. A shaft drive, especially for scraper coolers, which includes: stationary housing means having one end portion provided with a trunnion, a sprocket wheel rotatably journaled on said trunnion, a shaft rotatably journaled within said housing means, entraining means keyed to said shaft, and overload breaking pin means interconnecting said sprocket wheel and said entraining means, said trunnion and said housing means together forming a single cast piece.

3. A drive according to claim 1, in which said trunnion formed as a bearing neck and said stationary housing means are composed of at least two parts rigidly connected to each other.

4. A drive according to claim 2, in which said trunnion axially extends through said sprocket wheel, and in which one end portion of said shaft axially extends outwardly through said trunnion, said entraining means being keyed to that end portion of said shaft which extends outwardly through said trunnion.

* * * * *